United States Patent
Tang

(10) Patent No.: US 9,350,263 B2
(45) Date of Patent: May 24, 2016

(54) APPARATUS FOR CONTROLLING CONVERSION BETWEEN ALTERNATING CURRENT AND DIRECT CURRENT

(71) Applicant: Huawei Technologies Co., Ltd., Shenzhen (CN)

(72) Inventor: Mi Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/637,549

(22) Filed: Mar. 4, 2015

(65) Prior Publication Data

US 2015/0256102 A1    Sep. 10, 2015

(30) Foreign Application Priority Data

Mar. 4, 2014  (CN) .......................... 2014 1 0075710

(51) Int. Cl.
*H02M 7/219*  (2006.01)

(52) U.S. Cl.
CPC ...... *H02M 7/219* (2013.01); *H02M 2007/2195* (2013.01)

(58) Field of Classification Search
CPC ........... H02M 7/00; H02M 7/02; H02M 7/04; H02M 7/12; H02M 7/125; H02M 7/155; H02M 7/1555; H02M 7/1557; H02M 7/162; H02M 7/1623; H02M 7/1626; H02M 7/21; H02M 7/217; H02M 7/219
USPC .................................... 363/13, 74, 78, 84, 89
See application file for complete search history.

(56) References Cited

U.S. PATENT DOCUMENTS

| | | | |
|---|---|---|---|
| 6,181,588 B1 | 1/2001 | Kates et al. | |
| 6,324,084 B1 | 11/2001 | Fujisawa | |
| 6,327,164 B1 | 12/2001 | Shinkawa | |
| 2009/0273959 A1* | 11/2009 | Sells | H02M 7/219 363/127 |
| 2012/0099354 A1* | 4/2012 | Gao | H02M 3/33507 363/84 |
| 2012/0099356 A1* | 4/2012 | Usami | H02M 7/219 363/126 |
| 2013/0176758 A1 | 7/2013 | Tseng et al. | |
| 2013/0235635 A1 | 9/2013 | Takahagi et al. | |
| 2013/0314072 A1* | 11/2013 | Miyazaki | G01R 19/14 324/76.77 |
| 2014/0268956 A1* | 9/2014 | Teren | H02M 7/219 363/89 |

FOREIGN PATENT DOCUMENTS

| | | |
|---|---|---|
| CN | 001148288 A | 4/1997 |
| CN | 1289476 A | 3/2001 |
| CN | 1304202 A | 7/2001 |
| CN | 103199717 A | 7/2013 |
| CN | 103299531 A | 9/2013 |

OTHER PUBLICATIONS

Foreign Communication From a Counterpart Application, Chinese Application No. 201410075710.0, Chinese Office Action dated Dec. 1, 2015, 6 pages.
Foreign Communication From a Counterpart Application, Chinese Application No. 201410075710.0, Chinese Search Report dated Oct. 22, 2015, 2 pages.

* cited by examiner

*Primary Examiner* — Jessica Han
*Assistant Examiner* — David A. Singh
(74) *Attorney, Agent, or Firm* — Conley Rose, P.C.; Grant Rodolph; Nicholas K. Beaulieu

(57) ABSTRACT

Embodiments provide an apparatus for controlling conversion between an alternating current and a direct current, including a rectifier circuit, a detection circuit, and a logic circuit, where the detection circuit includes a voltage divider module, a first comparator module, and a second comparator module.

8 Claims, 4 Drawing Sheets

APPARATUS FOR CONTROLLING CONVERSION BETWEEN ALTERNATING CURRENT AND DIRECT CURRENT

CROSS-REFERENCE TO RELATED APPLICATION

This application claims priority to Chinese Patent Application No. 201410075710.0, filed on Mar. 4, 2014, the contents of which are hereby incorporated herein by reference.

TECHNICAL FIELD

The present invention relates to the field of electronic technologies, and in particular, to an apparatus for controlling conversion between an alternating current and a direct current.

BACKGROUND

In a commonly used rectifier device, conversion between an alternating current and a direct current is generally implemented by using a bridge rectifier formed by four Schottky diodes. However, while requirements on power efficiency and limitation on external space are increasing, the Schottky diode is gradually replaced by an N-type metal-oxide-semiconductor (MOS) transistor, and is disposed in a chip to occupy less space.

In the prior art, a switch controlling a MOS transistor includes a comparator module which includes three comparators that separately compare voltages of any two of a first alternating current input end, a second alternating current input end, and a direct current output end of a rectifier circuit, so as to control switches of four MOS transistors. However, because only one MOS transistor is disposed between the first alternating current input end and the direct current output end, and only one MOS transistor is disposed between the second alternating current input end and the direct current output end, that is, a difference between a voltage value of the direct current output end and a voltage value of the first alternating current input end, and a difference between the voltage value of the direct current output end and a voltage value of the second alternating current input end are only a voltage drop of one MOS transistor, their voltage values are close, which imposes a relatively high requirement on precision of the comparators. Moreover, in a case in which dysfunction occurs in a comparator, misjudgment is easily caused, which affects a normal function of the switch controlling the MOS transistor, and current leakage from the direct current output end to the first alternating current input end and the second alternating current input end is also easily caused, thereby ultimately causing poor chip consistency, and affecting the yield of mass production of chips.

SUMMARY

Embodiments of the present invention provide an apparatus for controlling conversion between an alternating current and a direct current, which can accurately control turnoff of a MOS transistor, and is not easy to cause an error in controlling conversion between an alternating current and a direct current in a case of dysfunction of a comparator.

A first aspect of the embodiments of the present invention provides an apparatus for controlling conversion between an alternating current and a direct current, including a rectifier circuit, a detection circuit, and a logic circuit, where the rectifier circuit includes a first alternating current input end, a second alternating current input end, a direct current output end, and a control end; the detection circuit includes a voltage divider module, a first comparator module, and a second comparator module; and the logic circuit includes a first input end, a second input end, and an output end, where a first input end, a second input end, and a third input end of the voltage divider module are respectively connected to the first alternating current input end, the second alternating current input end, and the direct current output end of the rectifier circuit, and the voltage divider module is configured to perform voltage dividing for an input alternating current voltage and a direct current voltage; an input end of the first comparator module is connected to an output end of the voltage divider module, an output end of the first comparator module is connected to the first input end of the logic circuit, and the first comparator module is configured to compare a voltage of the first alternating current input end with a voltage of the ground and a voltage of the second alternating current input end with the voltage of the ground, and output a first control level to the first input end of the logic circuit according to a first comparison result; an input end of the second comparator module is connected to the output end of the voltage divider module, an output end of the second comparator module is connected to the second input end of the logic circuit, and the second comparator module is configured to compare voltages of any two of the first alternating current input end, the second alternating current input end, and the direct current output end, and output a second control level to the second input end of the logic circuit according to a second comparison result; and the output end of the logic circuit is connected to the control end of the rectifier circuit, and the logic circuit controls rectification of the rectifier circuit according to the first control level output by the first comparator module and the second control level output by the second comparator module.

In a first possible implementation manner of the first aspect of the embodiments of the present invention, the rectifier circuit includes a first MOS transistor, a second MOS transistor, a third MOS transistor, and a fourth MOS transistor, where the output end of the logic circuit includes a first output end, a second output end, a third output end, and a fourth output end; the control end of the rectifier circuit includes a first control end, a second control end, a third control end, and a fourth control end, where the first control end is connected to the first output end of the logic circuit, the second control end is connected to the second output end of the logic circuit, the third control end is connected to the third output end of the logic circuit, and the fourth control end is connected to the fourth output end of the logic circuit; a gate of the first MOS transistor is the first control end of the rectifier circuit, a drain of the first MOS transistor is connected to a drain of the second MOS transistor, a source of the first MOS transistor is connected to a drain of the fourth MOS transistor, a common node of the drain of the first MOS transistor and the drain of the second MOS transistor is the direct current output end of the rectifier circuit, and a common node of the source of the first MOS transistor and the drain of the fourth MOS transistor is the first alternating current input end of the rectifier circuit; a gate of the second MOS transistor is the second control end of the rectifier circuit, a source of the second MOS transistor is connected to a drain of the third MOS transistor, and a common node of the source of the second MOS transistor and the drain of the third MOS transistor is the second alternating current input end of the rectifier circuit; a gate of the third MOS transistor is the third control end of the rectifier circuit, and a source of the third MOS transistor is grounded;

and a gate of the fourth MOS transistor is the fourth control end of the rectifier circuit, and a source of the fourth MOS transistor is grounded.

With reference to the first possible implementation manner of the first aspect of the embodiments of the present invention, in a second possible implementation manner of the first aspect of the embodiments of the present invention, the rectifier circuit further includes a capacitor, where a positive electrode of the capacitor is connected to the direct current output end of the rectifier circuit, and a negative electrode of the capacitor is grounded.

With reference to the implementation manner of the first aspect of the embodiments of the present invention, in a third possible implementation manner of the first aspect of the embodiments of the present invention, the voltage divider module includes a first voltage divider unit, and the first voltage divider unit includes a first resistor and a second resistor, where one end of the first resistor is the first input end of the voltage divider module and is connected to the input end of the first comparator module, the other end of the first resistor is grounded by using the second resistor, and a common node of the first resistor and the second resistor is connected to the input end of the second comparator module.

With reference to the third possible implementation manner of the first aspect of the embodiments of the present invention, in a fourth possible implementation manner of the first aspect of the embodiments of the present invention, the voltage divider module further includes a second voltage divider unit, and the second voltage divider unit includes a third resistor and a fourth resistor, where one end of the third resistor is the second input end of the voltage divider module and is connected to the input end of the first comparator module, the other end of the third resistor is grounded by using the fourth resistor, and a common node of the third resistor and the fourth resistor is connected to the input end of the second comparator module.

With reference to the third possible implementation manner of the first aspect of the embodiments of the present invention, in a fifth possible implementation manner of the first aspect of the embodiments of the present invention, the voltage divider module further includes a third voltage divider unit, and the third voltage divider unit includes a fifth resistor and a sixth resistor, where one end of the fifth resistor is the third input end of the voltage divider module, the other end of the fifth resistor is grounded by using the sixth resistor, and a common node of the fifth resistor and the sixth resistor is connected to the input end of the second comparator module.

With reference to the possible implementation manner of the first aspect of the embodiments of the present invention, in a sixth possible implementation manner of the first aspect of the embodiments of the present invention, the first comparator module includes a first comparator and a second comparator, where the input end of the first comparator module includes a first input end and a second input end of the first comparator and a third input end and a fourth input end of the second comparator; the output end of the first comparator module includes an output end of the first comparator and an output end of the second comparator; the first input end of the logic circuit includes a first signal input end and a second signal input end; the first input end of the first comparator is connected to the first input end of the voltage divider module, the second input end of the first comparator is grounded, and the output end of the first comparator is connected to the first signal input end of the logic circuit; and the third input end of the second comparator is connected to the second input end of the voltage divider module, the fourth input end of the second comparator is grounded, and the output end of the second comparator is connected to the second signal input end of the logic circuit.

With reference to the first aspect, the third possible implementation manner of the first aspect, the fourth possible implementation manner of the first aspect or the fifth possible implementation manner of the first aspect of the embodiments of the present invention, in a seventh possible implementation manner of the first aspect of the embodiments of the present invention, the second comparator module includes a third comparator, a fourth comparator, and a fifth comparator, where the input end of the second comparator module includes a fifth input end and a sixth input end of the third comparator, a seventh input end and an eighth input end of the fourth comparator, and a ninth input end and a tenth input end of the fifth comparator; the output end of the second comparator module includes an output end of the third comparator, an output end of the fourth comparator, and an output end of the fifth comparator; the second input end of the logic circuit includes a third signal input end, a fourth signal input end, and a fifth signal input end; the fifth input end of the third comparator is connected to the common node of the first resistor and the second resistor, the sixth input end of the third comparator is connected to the common node of the third resistor and the fourth resistor, and the output end of the third comparator is connected to the third signal input end of the logic circuit; the seventh input end of the fourth comparator is connected to the common node of the fifth resistor and the sixth resistor, the eighth input end of the fourth comparator is connected to the common node of the third resistor and the fourth resistor, and the output end of the fourth comparator is connected to the fourth signal input end of the logic circuit; and the ninth input end of the fifth comparator is connected to the common node of the first resistor and the second resistor, the tenth input end of the fifth comparator is connected to the common node of the fifth resistor and the sixth resistor, and the output end of the fifth comparator is connected to the fifth signal input end of the logic circuit.

By using the embodiments of the present invention, turnoff of a MOS transistor can be determined more precisely by further comparing a voltage of a first alternating current input end with a voltage of the ground, and a voltage of a second alternating current input end with the voltage of the ground, so that voltage values of the first alternating current input end, the second alternating current input end, and a direct current output end in a rectifier circuit can still be accurately determined even if a comparator is in a dysfunction state, thereby improving the yield of mass production.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and a person of ordinary skill in the art may still derive other drawings from these accompanying drawings without creative efforts.

DESCRIPTION OF EMBODIMENTS

The following describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

The embodiments of the present invention can accurately control turnoff of a MOS transistor, and it is not easy to cause an error in controlling conversion between an alternating current and a direct current in a case of dysfunction of a comparator.

Figure 1:
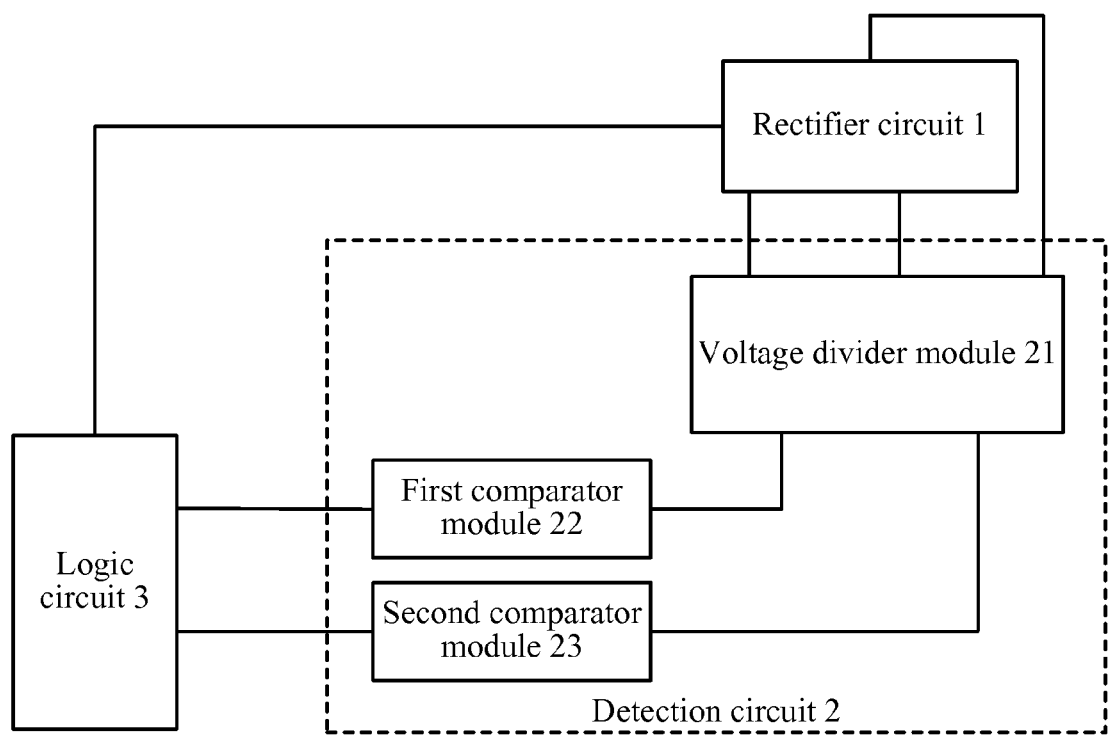
FIG. 1 is a schematic structural composition diagram of modules of an apparatus for controlling conversion between an alternating current and a direct current according to an embodiment of the present invention.

Referring to FIG. 1, FIG. 1 is a schematic structural composition diagram of modules of an apparatus for controlling conversion between an alternating current and a direct current according to an embodiment of the present invention. An apparatus for controlling conversion between an alternating current and a direct current provided in this embodiment of the present invention includes a rectifier circuit 1, a detection circuit 2, and a logic circuit 3. The rectifier circuit 1 is configured to rectify an input alternating current, and the rectifier circuit 1 includes a first alternating current input end, a second alternating current input end, a direct current output end, and a control end. The detection circuit 2 is configured to output a control signal according to changes of an alternating current voltage and a direct current voltage in the rectifier circuit 1, and the detection circuit 2 includes a voltage divider module 21, a first comparator module 22, and a second comparator module 23. The logic circuit 3 is configured to control rectification of the rectifier circuit 1 according to the control signal output by the detection circuit 2, and the logic circuit 3 includes a first input end, a second input end, and an output end.

A first input end, a second input end, and a third input end of the voltage divider module 21 are respectively connected to the first alternating current input end, the second alternating current input end, and the direct current output end of the rectifier circuit 1, and the voltage divider module 21 is configured to perform voltage dividing for an input alternating current voltage and a direct current voltage. An input end of the first comparator module 22 is connected to an output end of the voltage divider module 21, an output end of the first comparator module 22 is connected to the first input end of the logic circuit 3, and the first comparator module 22 is configured to compare a voltage of the first alternating current input end with a voltage of the ground and a voltage of the second alternating current input end with the voltage of the ground, and output a first control level to the first input end of the logic circuit 3 according to a first comparison result. An input end of the second comparator module 23 is connected to the output end of the voltage divider module 21, an output end of the second comparator module 23 is connected to the second input end of the logic circuit 3, and the second comparator module 23 is configured to compare voltages of any two of the first alternating current input end, the second alternating current input end, and the direct current output end, and output a second control level to the second input end of the logic circuit 3 according to a second comparison result. The output end of the logic circuit 3 is connected to the control end of the rectifier circuit 1, and the logic circuit 3 controls rectification of the rectifier circuit 1 according to the first control level output by the first comparator module 22 and the second control level output by the second comparator module 23.

By implementing the apparatus for controlling conversion between an alternating current and a direct current described in FIG. 1, turnoff of components in a rectifier circuit can be accurately controlled by further comparing a voltage of a first alternating current input end with a voltage of the ground, and a voltage of a second alternating current input end with the voltage of the ground, so that rectification of the rectifier circuit can be controlled more precisely, and voltage values of the first alternating current input end, the second alternating current input end, and a direct current output end in the rectifier circuit can still be accurately determined even if a comparator is in a dysfunction state, thereby improving the yield of mass production of chips.

Figure 2:
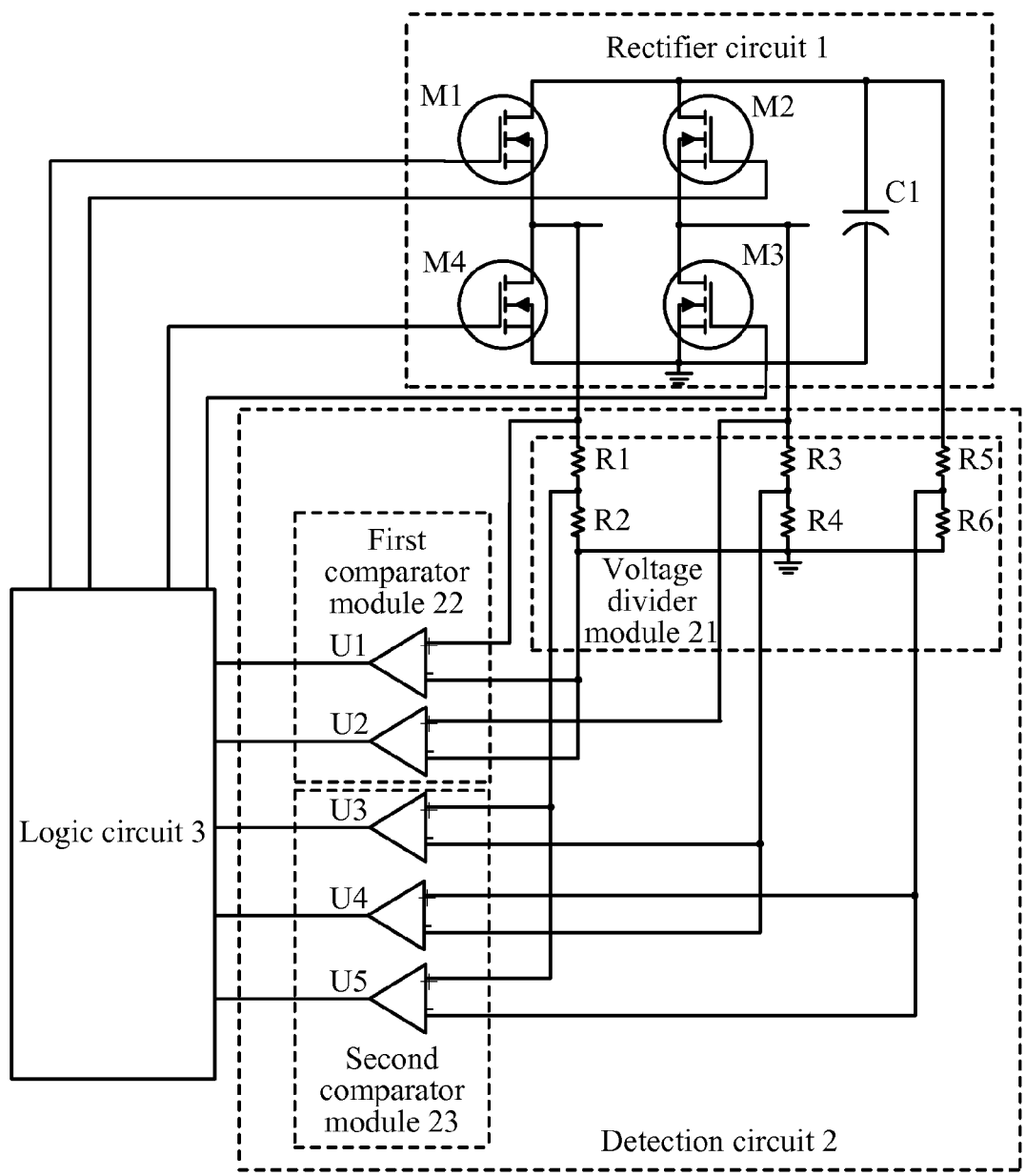
FIG. 2 is a schematic structural composition diagram of circuits of an apparatus for controlling conversion between an alternating current and a direct current according to an embodiment of the present invention.

Referring to FIG. 2, FIG. 2 is a schematic structural composition diagram of circuits of an apparatus for controlling conversion between an alternating current and a direct current according to an embodiment of the present invention. An apparatus for controlling conversion between an alternating current and a direct current provided in this embodiment of the present invention includes a rectifier circuit 1, a detection circuit 2, and a logic circuit 3. The rectifier circuit 1 includes a first alternating current input end, a second alternating current input end, a direct current output end, and a control end, the detection circuit 2 includes a voltage divider module 21, a first comparator module 22, and a second comparator module 23, and the logic circuit 3 includes a first input end, a second input end, and an output end. A first input end, a second input end, and a third input end of the voltage divider module 21 are respectively connected to the first alternating current input end, the second alternating current input end, and the direct current output end of the rectifier circuit 1, and the voltage divider module 21 is configured to perform voltage dividing for an input alternating current voltage and a direct current voltage. An input end of the first comparator module 22 is connected to an output end of the voltage divider module 21, an output end of the first comparator module 22 is connected to the first input end of the logic circuit 3, and the first comparator module 22 is configured to compare a voltage of the first alternating current input end with a voltage of the ground and a voltage of the second alternating current input end with the voltage of the ground, and output a first control level to the first input end of the logic circuit 3 according to a first comparison result. An input end of the second comparator module 23 is connected to the output end of the voltage divider module 21, an output end of the second comparator module 23 is connected to the second input end of the logic circuit 3, and the second comparator module 23 is configured to compare voltages of any two of the first alternating current input end, the second alternating current input end, and the direct current output end, and output a control level to the second input end of the logic circuit 3 according to a second comparison result. The second output end of the logic circuit 3 is connected to the control end of the rectifier circuit 1, and the logic circuit 3 controls rectification of the rectifier circuit 1 according to the first control level output by the first comparator module 22 and the second control level output by the second comparator module 23.

As an executable manner, the first alternating current input end and the second alternating current input end of the rectifier circuit 1 are connected to an alternating current power supply (which is not shown in FIG. 2).

As an executable manner, in this embodiment of the present invention, a MOS transistor is used as a main body of a bridge rectifier to replace a diode, and the logic circuit 3 controls a switch of each MOS transistor to implement rectification. The rectifier circuit 1 includes a first MOS transistor M1, a second MOS transistor M2, a third MOS transistor M3, and a fourth MOS transistor M4. The output end of the logic circuit 3 includes a first output end, a second output end, a third output end, and a fourth output end. The control end of the rectifier circuit 1 includes a first control end, a second control end, a third control end, and a fourth control end, where the first control end is connected to the first output end of the logic circuit 3, the second control end is connected to the second output end of the logic circuit 3, the third control end is connected to the third output end of the logic circuit 3, and the fourth control end is connected to the fourth output end of the logic circuit 3. A gate of the first MOS transistor M1 is the first control end of the rectifier circuit 1, a drain of the first MOS transistor M1 is connected to a drain of the second MOS transistor M2, a source of the first MOS transistor M1 is connected to a drain of the fourth MOS transistor M4, a common node of the drain of the first MOS transistor M1 and the drain of the second MOS transistor M2 is the direct current output end of the rectifier circuit 1, and a common node of the source of the first MOS transistor M1 and the drain of the fourth MOS transistor M4 is the first alternating current input end of the rectifier circuit 1. A gate of the second MOS transistor M2 is the second control end of the rectifier circuit 1, a source of the second MOS transistor M2 is connected to a drain of the third MOS transistor M3, and a common node of the source of the second MOS transistor M2 and the drain of the third MOS transistor M3 is the first alternating current input end of the rectifier circuit 1. A gate of the third MOS transistor M3 is the third control end of the rectifier circuit 1, and a source of the third MOS transistor M3 is grounded. A gate of the fourth MOS transistor M4 is the fourth control end of the rectifier circuit 1, and a source of the fourth MOS transistor M4 is grounded.

As an executable manner, the rectifier circuit 1 further includes a capacitor C1, where a positive electrode of the capacitor C1 is connected to the direct current output end of the rectifier circuit 1, and a negative electrode of the capacitor C1 is grounded.

Figure 3:
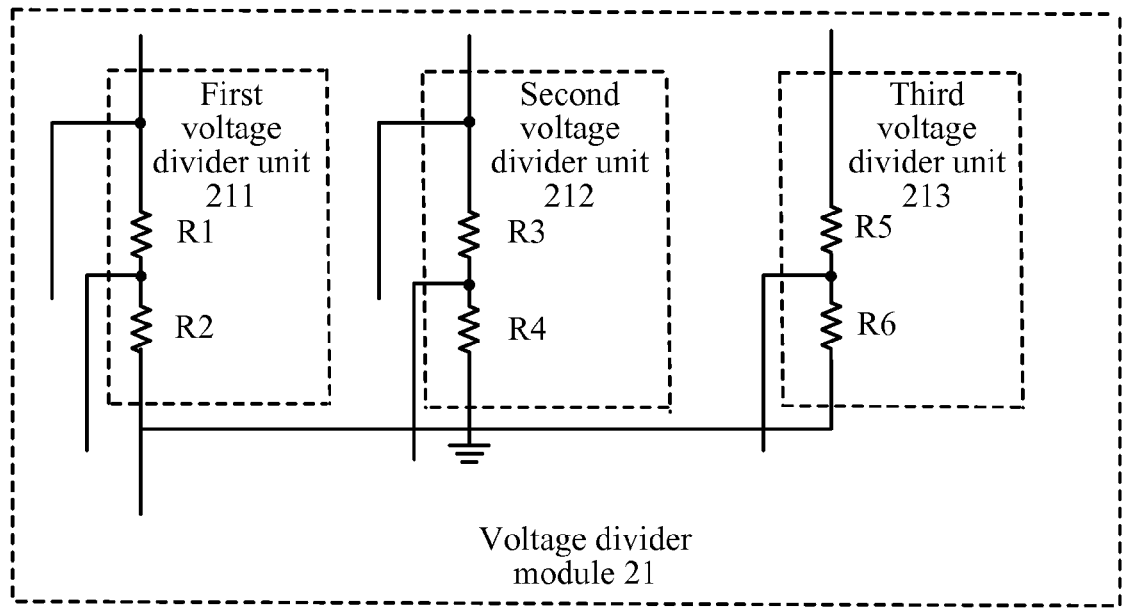
FIG. 3 is a schematic structural composition diagram of a circuit of a voltage divider module of an apparatus for controlling conversion between an alternating current and a direct current according to an embodiment of the present invention.

As an executable manner, with reference to FIG. 3, the voltage divider module 21 includes a first voltage divider unit 211, and the first voltage divider unit 211 includes a first resistor R1 and a second resistor R2. One end of the first resistor R1 is the first input end of the voltage divider module 21, that is, the one end of the first resistor R1 is connected to the first alternating current input end of the rectifier circuit 1 and is also connected to the input end of the first comparator module 22, the other end of the first resistor R1 is grounded by using the second resistor R2, and a common node of the first resistor R1 and the second resistor R2 is connected to the input end of the second comparator module 23.

As an executable manner, the voltage divider module 21 further includes a second voltage divider unit 212, and the second voltage divider unit 212 includes a third resistor R3 and a fourth resistor R4. One end of the third resistor R3 is the second input end of the voltage divider module 21, that is, the one end of the third resistor R3 is connected to the second alternating current input end of the rectifier circuit 1 and is also connected to the input end of the first comparator module 22, the other end of the third resistor R3 is grounded by using the fourth resistor R4, and a common node of the third resistor R3 and the fourth resistor R4 is connected to the input end of the second comparator module 23.

As an executable manner, the voltage divider module 21 further includes a third voltage divider unit 213, and the third voltage divider unit 213 includes a fifth resistor R5 and a sixth resistor R6. One end of the fifth resistor R5 is the third input end of the voltage divider module 21, that is, the one end of the fifth resistor R5 is connected to the direct current output end of the rectifier circuit 1, the other end of the fifth resistor R5 is grounded by using the sixth resistor R6, and a common node of the fifth resistor R5 and the sixth resistor R6 is connected to the input end of the second comparator module 23. The first voltage divider unit 211, the second voltage divider unit 212, and the third voltage divider unit 213 respectively perform voltage dividing on voltages of the first alternating current input end, the second alternating current input end, and the direct current output end, so as to prevent the comparator modules respectively connected to the first alternating current input end, the second alternating current input end, and the direct current output end from abnormally working or even being burned due to direct connections to a high voltage.

As an executable manner, the first comparator module 22 includes a first comparator U1 and a second comparator U2. The input end of the first comparator module 22 includes a first input end and a second input end of the first comparator U1 and a third input end and a fourth input end of the second comparator U2. The output end of the first comparator module 22 includes an output end of the first comparator U1 and an output end of the second comparator U2. The first input end of the logic circuit 3 includes a first signal input end and a second signal input end.

The first input end of the first comparator U1 is connected to the first input end of the voltage divider module 21, the second input end of the first comparator U1 is grounded, and the output end of the first comparator U1 is connected to the first signal input end of the logic circuit 3. The first comparator U1 is configured to compare a voltage of the first alternating current input end of the rectifier circuit 1 with a voltage of the ground, and output a first comparison result to the first signal input end of the logic circuit 3.

The third input end of the second comparator U2 is connected to the second input end of the voltage divider module 21, the fourth input end of the second comparator U2 is grounded, and the output end of the second comparator U2 is connected to the second signal input end of the logic circuit 3. The second comparator U2 is configured to compare a voltage of the second alternating current input end of the rectifier circuit 1 with the voltage of the ground, and output a second comparison result to the second signal input end of the logic circuit 3.

As an executable manner, the second comparator module 23 includes a third comparator U3, a fourth comparator U4, and a fifth comparator U5. The input end of the second comparator module 23 includes a fifth input end and a sixth input end of the third comparator U3, a seventh input end and an eighth input end of the fourth comparator U4, and a ninth input end and a tenth input end of the fifth comparator U5. The output end of the second comparator module 23 includes an output end of the third comparator U3, an output end of the fourth comparator U4, and an output end of the fifth comparator U5. The second input end of the logic circuit 3 includes a third signal input end, a fourth signal input end, and a fifth signal input end.

The fifth input end of the third comparator U3 is connected to the common node of the first resistor R1 and the second resistor R2, the sixth input end of the third comparator U3 is connected to the common node of the third resistor R3 and the fourth resistor R4, and the output end of the third comparator U3 is connected to the third signal input end of the logic circuit 3. The third comparator U3 is configured to compare a voltage of the first alternating current input end and a voltage of the second alternating current input end, of the rectifier circuit 1, after voltage dividing, and configured to output a third comparison result to the third signal input end of the logic circuit 3.

The seventh input end of the fourth comparator U4 is connected to the common node of the fifth resistor R5 and the sixth resistor R6, the eighth input end of the fourth comparator U4 is connected to the common node of the third resistor R3 and the fourth resistor R4, and the output end of the fourth comparator U4 is connected to the fourth signal input end of the logic circuit 3. The fourth comparator U4 is configured to compare a voltage of the direct current output end and a voltage of the second alternating current input end, of the rectifier circuit 1, after voltage dividing, and configured to output a fourth comparison result to the fourth signal input end of the logic circuit 3.

The ninth input end of the fifth comparator U5 is connected to the common node of the first resistor R1 and the second resistor R2, the tenth input end of the fifth comparator U5 is connected to the common node of the fifth resistor R5 and the sixth resistor R6, and the output end of the fifth comparator U5 is connected to the fifth signal input end of the logic circuit 3. The fifth comparator U5 is configured to compare a voltage of the first alternating current input end and a voltage of the direct current output end, of the rectifier circuit 1, after voltage dividing, and configured to output a fifth comparison result to the fifth signal input end of the logic circuit 3.

As an executable manner, the first output end of the logic circuit 3 is configured to control a switch of the first MOS transistor M1 with reference to the second comparison result of the second comparator U2 and the fifth comparison result of the fifth comparator U5. The second output end of the logic circuit 3 is configured to control a switch of the second MOS transistor M2 with reference to the first comparison result of the first comparator U1 and the fourth comparison result of the fourth comparator U4. The third output end of the logic circuit 3 is configured to control a switch of the third MOS transistor M3 according to the third comparison result of the third comparator U3. The fourth output end of the logic circuit 3 is configured to control a switch of the fourth MOS transistor M4 according to the third comparison result of the third comparator U3.

By implementing the apparatus for controlling conversion between an alternating current and a direct current described in FIG. 2, turnoff of a MOS transistor can be accurately controlled with reference to comparison results of a second comparator U2 and a fifth comparator U5 and with reference to comparison results of a first comparator U1 and a fourth comparator U4, so that rectification of a rectifier circuit can be more precisely controlled, and voltage values of a first alternating current input end, a second alternating current input end, and a direct current output end in the rectifier circuit can still be accurately determined even if a comparator is in a dysfunction state, thereby improving the yield of mass production of chips.

During specific implementation, a working principle of a circuit in this embodiment of the present invention is roughly as follows.

Figure 4:
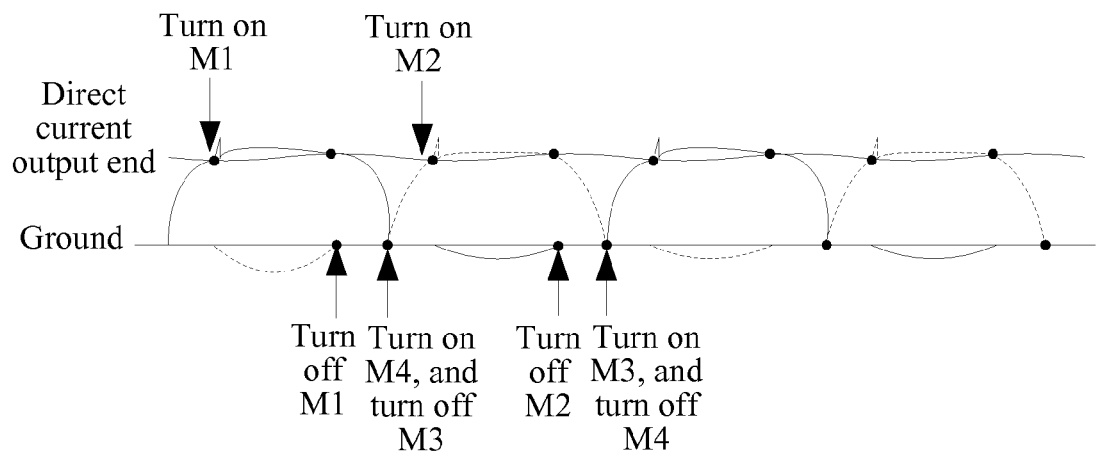
FIG. 4 is a waveform graph of an alternating current voltage of an apparatus for controlling conversion between an alternating current and a direct current according to an embodiment of the present invention.

With reference to a waveform graph of an alternating current voltage shown in FIG. 4, this embodiment of the present invention provides detailed description as follows. A curve that is nearly parallel to a straight line indicating the ground is a curve of a voltage of a direct current output end, a first semicircle is a voltage of a first alternating current input end, and a second semicircle is a voltage of a second alternating current input end. In this way, it can be seen from the waveform graph of the alternating current voltage in FIG. 4 that a voltage is alternately input by using the first alternating current input end and the second alternating current input end.

When the voltage is input from the first alternating current input end, a fifth comparator U5 detects, by detecting a common node of a first resistor R1 and a second resistor R2, and a common node of a fifth resistor R5 and a sixth resistor R6, that a voltage of the first alternating current input end after voltage dividing is higher than a voltage of the direct current output end after voltage dividing, and therefore, a first MOS transistor M1 is turned on by using a first output end of a logic circuit 3; when a third comparator U3 detects, by detecting the common node of the first resistor R1 and the second resistor R2, and a common node of a third resistor R3 and a fourth resistor R4, that the voltage of the first alternating current input end after voltage dividing is higher than a voltage of the second alternating current input end after voltage dividing, a third MOS transistor M3 is turned on by using a third output end of the logic circuit 3. In this case, both the first MOS transistor M1 and the third MOS transistor M3 are conducted, that is, a current passing through the first MOS transistor M1 is equal to a current passing through the third MOS transistor M3, and an alternating current is input from the first alternating current input end, passes through the first MOS transistor M1 and the third MOS transistor M3, and is output from the second alternating current input end. In addition, both a second MOS transistor M2 and a fourth MOS transistor M4 remain in an off state, that is, a current passing through the second MOS transistor M2 and a current passing through the fourth MOS transistor M4 are zero.

When a second comparator U2 detects that the voltage of the second alternating current input end is higher than that of the ground, the first MOS transistor M1 is turned off by using the first output end of the logic circuit 3; when the third comparator U3 detects, by detecting the common node of the third resistor R3 and the fourth resistor R4, and the common node of the first resistor R1 and the second resistor R2, that the voltage of the second alternating current input end after voltage dividing is higher than the voltage of the first alternating current input end after voltage dividing, the fourth MOS transistor M4 is turned on by using a fourth output end of the logic circuit 3, and a third MOS transistor M3 is turned off by using the third output end of the logic circuit 3; when a fourth comparator U4 detects, by detecting the common node of the third resistor R3 and the fourth resistor R4, and the common node of the fifth resistor R5 and the sixth resistor R6, that the voltage of the second alternating current input end after voltage dividing is higher than the voltage of the direct current output end after voltage dividing, the second MOS transistor M2 is turned on by using a second output end of the logic circuit 3. In this case, both the second MOS transistor M2 and the fourth MOS transistor M4 are conducted, that is, a current passing through the second MOS transistor M2 is equal to a current passing through the fourth MOS transistor M4, and an alternating current is input from the second alternating current input end, passes through the second MOS transistor M2 and the fourth MOS transistor M4, and is output from the first alternating current input end. In addition, both the first MOS transistor M1 and the third MOS transistor M3 remain in an off state, that is, a current passing through the first MOS transistor M1 and a current passing through the third MOS transistor M3 are zero.

Figure 5:
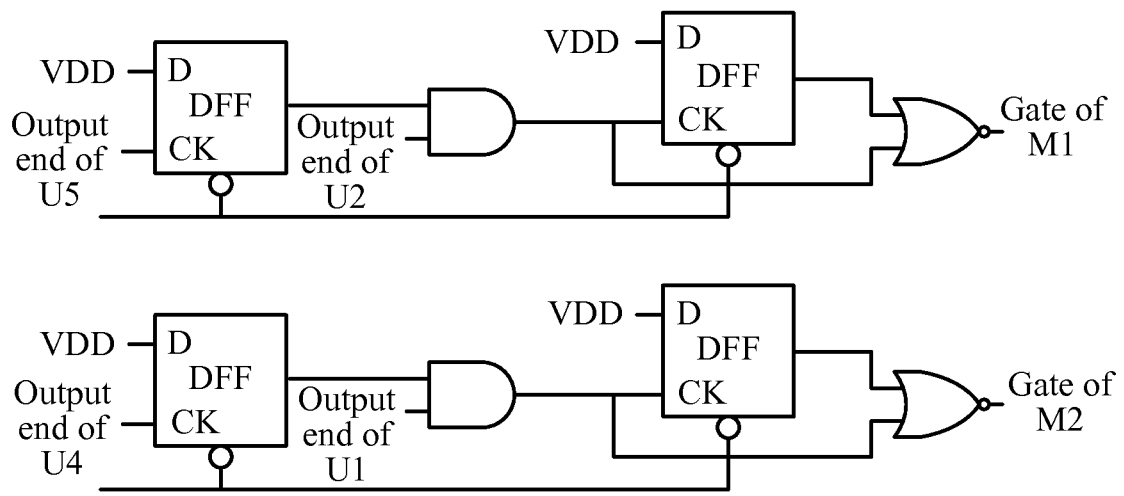
FIG. 5 is a schematic structural diagram of a partial circuit of a logic circuit of an apparatus for controlling conversion between an alternating current and a direct current according to an embodiment of the present invention.

With reference to FIG. 5, it can be seen that a first output end of a logic circuit 3 controls turnoff of a first MOS transistor M1 with reference to a determining result of a second comparator U2 and a determining result of a fifth comparator U5. Therefore, even if in a case of dysfunction of the fifth comparator U5, once the second comparator U2 obtains, by comparison, that a voltage of a second alternating current input end is close to that of the ground, the first MOS transistor M1 can be turned on. A second output end of the logic circuit 3 controls turnoff of a second MOS transistor M2 with reference to a determining result of a first comparator U1 and a determining result of a fourth comparator U4, and a working principle of the second output end of the logic circuit 3 is the same as that of the first output end of the logic circuit 3. Therefore, in a case of collaboration between the first comparator U1 and the second comparator U2, a comparison error can be reduced; in a case in which a process error causes great dysfunction of a comparator, a fault in a function is not easily caused, a process deviation tolerance can be relatively improved, and system reliability can be enhanced, which is more beneficial to improving the yield of mass production of products.

The described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present invention without creative efforts.

Order adjustment, combination, and deletion can be performed on the steps in the method of the embodiments of the present invention according to an actual requirement.

Combination, division, and deletion can be performed on the modules or the units in the apparatus of the embodiments of the present invention according to an actual requirement.

The modules or the units in the embodiments of the present invention can be implemented by using a universal integrated circuit (such as a central processing unit (CPU)), or an application-specific integrated circuit (ASIC).

Based on the foregoing descriptions of the embodiments, a person skilled in the art may clearly understand that each implementation manner may be implemented by software in addition to a necessary general hardware platform or by hardware. Based on such an understanding, the foregoing technical solutions essentially or the part contributing to the prior art may be implemented in a form of a software product. The software product may be stored in a computer readable storage medium, such as a read-only memory (ROM)/random-access memory (RAM), a hard disk, or an optical disc, and includes several instructions for instructing a computer device (which may be a personal computer, a server, a network device, or the like) to perform the methods described in the embodiments or some parts of the embodiments.

The foregoing implementation manners are not intended to limit the protection scope of the technical solutions. Any modification, equivalent replacement, and improvement made without departing from the spirit and principle of the foregoing implementation manners shall fall within the protection scope of the technical solutions.

What is claimed is:

1. An apparatus for controlling conversion between an alternating current voltage and a direct current voltage, comprising:
    a rectifier circuit;
    a detection circuit; and
    a logic circuit,
    wherein the rectifier circuit comprises a first alternating current input end, a second alternating current input end, a direct current output end, and a control end,
    wherein the detection circuit comprises a voltage divider module, a first comparator module, and a second comparator module,
    wherein the logic circuit comprises a first input end, a second input end, and an output end,
    wherein a first input end, a second input end, and a third input end of the voltage divider module are respectively connected to the first alternating current input end, the second alternating current input end, and the direct current output end of the rectifier circuit, and the voltage divider module is configured to perform voltage dividing for an input alternating current voltage and a direct current voltage,
    wherein an input end of the first comparator module is connected to an output end of the voltage divider module, an output end of the first comparator module is connected to the first input end of the logic circuit, and the first comparator module is configured to compare a voltage of the first alternating current input end with a voltage of the ground and to derive a first comparison result by comparing a voltage of the second alternating current input end with the voltage of the ground, and output a first control level to the first input end of the logic circuit according to the first comparison result,
    wherein an input end of the second comparator module is connected to the output end of the voltage divider module, an output end of the second comparator module is connected to the second input end of the logic circuit, and the second comparator module is configured to derive a second comparison result by comparing voltages of any two of the first alternating current input end, the second alternating current input end, and the direct current output end, and output a second control level to the second input end of the logic circuit according to the second comparison result, and
    wherein the output end of the logic circuit is connected to the control end of the rectifier circuit, and the logic circuit controls rectification of the rectifier circuit according to the first control level output by the first comparator module and the second control level output by the second comparator module.

2. The apparatus according to claim 1, wherein the rectifier circuit comprises a first metal-oxide-semiconductor (MOS) transistor, a second MOS transistor, a third MOS transistor, and a fourth MOS transistor, wherein the output end of the logic circuit comprises a first output end, a second output end, a third output end, and a fourth output end, wherein the control end of the rectifier circuit comprises a first control end, a second control end, a third control end, and a fourth control end, wherein the first control end is connected to the first output end of the logic circuit, the second control end is connected to the second output end of the logic circuit, the third control end is connected to the third output end of the logic circuit, and the fourth control end is connected to the fourth output end of the logic circuit, wherein a gate of the first MOS transistor is the first control end of the rectifier circuit, a drain of the first MOS transistor is connected to a drain of the second MOS transistor, a source of the first MOS transistor is connected to a drain of the fourth MOS transistor, a common node of the drain of the first MOS transistor and the drain of the second MOS transistor is the direct current output end of the rectifier circuit, and a common node of the source of the first MOS transistor and the drain of the fourth MOS transistor is the first alternating current input end of the rectifier circuit, wherein a gate of the second MOS transistor is the second control end of the rectifier circuit, a source of the second MOS transistor is connected to a drain of the third MOS transistor, and a common node of the source of the second MOS transistor and the drain of the third MOS transistor is the second alternating current input end of the rectifier circuit, wherein a gate of the third MOS transistor is the third control end of the rectifier circuit, and a source of the third MOS transistor is grounded, and wherein a gate of the fourth MOS transistor is the fourth control end of the rectifier circuit, and a source of the fourth MOS transistor is grounded.

3. The apparatus according to claim 2, wherein the rectifier circuit further comprises a capacitor, wherein a positive electrode of the capacitor is connected to the direct current output end of the rectifier circuit, and a negative electrode of the capacitor is grounded.

4. The apparatus according to claim 1, wherein the voltage divider module comprises a first voltage divider unit, and the first voltage divider unit comprises a first resistor and a second resistor, wherein one end of the first resistor is the first input end of the voltage divider module and is connected to the input end of the first comparator module, the other end of the first resistor is grounded via the second resistor, and a common node of the first resistor and the second resistor is connected to the input end of the second comparator module.

5. The apparatus according to claim 4, wherein the voltage divider module further comprises a second voltage divider unit, and the second voltage divider unit comprises a third resistor and a fourth resistor, wherein one end of the third resistor is the second input end of the voltage divider module and is connected to the input end of the first comparator module, the other end of the third resistor is grounded via the fourth resistor, and a common node of the third resistor and the fourth resistor is connected to the input end of the second comparator module.

6. The apparatus according to claim 4, wherein the voltage divider module further comprises a third voltage divider unit, and the third voltage divider unit comprises a fifth resistor and a sixth resistor, wherein one end of the fifth resistor is the third input end of the voltage divider module, the other end of the fifth resistor is grounded via the sixth resistor, and a common node of the fifth resistor and the sixth resistor is connected to the input end of the second comparator module.

7. The apparatus according to claim 1, wherein the first comparator module comprises a first comparator and a second comparator, wherein the input end of the first comparator module comprises a first input end and a second input end of the first comparator, and a third input end and a fourth input end of the second comparator, wherein the output end of the first comparator module comprises an output end of the first comparator and an output end of the second comparator, wherein the first input end of the logic circuit comprises a first signal input end and a second signal input end, wherein the first input end of the first comparator is connected to the first input end of the voltage divider module, the second input end of the first comparator is grounded, and the output end of the first comparator is connected to the first signal input end of the logic circuit, and wherein the third input end of the second comparator is connected to the second input end of the voltage divider module, the fourth input end of the second comparator is grounded, and the output end of the second comparator is connected to the second signal input end of the logic circuit.

8. The apparatus according to claim 1, wherein the second comparator module comprises a third comparator, a fourth comparator, and a fifth comparator, wherein the input end of the second comparator module comprises a fifth input end and a sixth input end of the third comparator, a seventh input end and an eighth input end of the fourth comparator, and a ninth input end and a tenth input end of the fifth comparator, wherein the output end of the second comparator module comprises an output end of the third comparator, an output end of the fourth comparator, and an output end of the fifth comparator, wherein the second input end of the logic circuit comprises a third signal input end, a fourth signal input end, and a fifth signal input end, wherein the fifth input end of the third comparator is connected to the common node of the first resistor and the second resistor, the sixth input end of the third comparator is connected to the common node of the third resistor and the fourth resistor, and the output end of the third comparator is connected to the third signal input end of the logic circuit, wherein the seventh input end of the fourth comparator is connected to the common node of the fifth resistor and the sixth resistor, the eighth input end of the fourth comparator is connected to the common node of the third resistor and the fourth resistor, and the output end of the fourth comparator is connected to the fourth signal input end of the logic circuit, and wherein the ninth input end of the fifth comparator is connected to the common node of the first resistor and the second resistor, the tenth input end of the fifth comparator is connected to the common node of the fifth resistor and the sixth resistor, and the output end of the fifth comparator is connected to the fifth signal input end of the logic circuit.

\* \* \* \* \*